Feb. 5, 1957  E. O. SCHJOLIN  2,780,477
KNOCK-DOWN TYPE DIRIGIBLE WHEEL MOUNTING
Filed Oct. 19, 1953
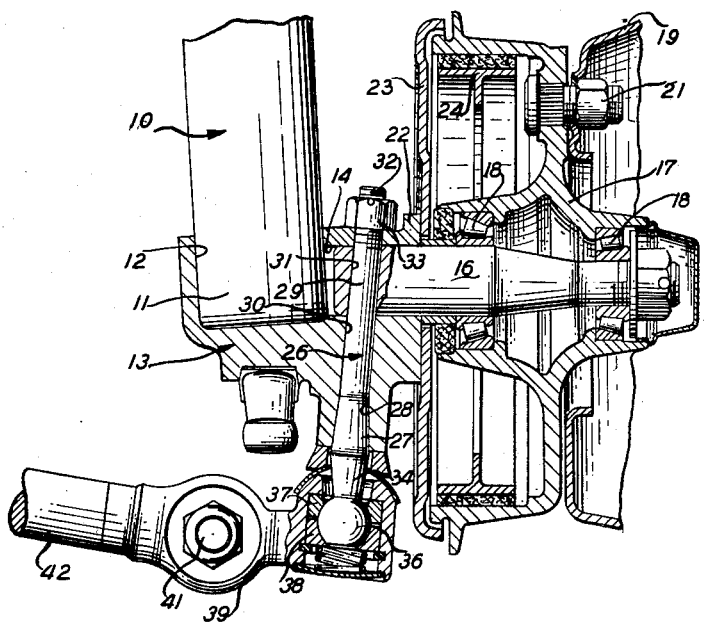
E. O. SCHJOLIN
INVENTOR.
BY E. C. McRae
J. R. Faulkner
J. H. Oster
ATTORNEYS United States Patent Office 2,780,477
Patented Feb. 5, 1957

2,780,477
KNOCK-DOWN TYPE DIRIGIBLE WHEEL MOUNTING

Eric O. Schjolin, Pontiac, Mich., assignor to Ford Motor Company, Dearborn, Mich., a corporation of Delaware Application October 19, 1953, Serial No. 386,895

2 Claims. (Cl. 280—96.2)

This invention relates generally to motor vehicles and more particularly to a wheel mounting for a motor vehicle.

An object of the invention is to provide an improved mounting for an independently suspended road wheel of a motor vehicle. The construction is particularly adapted for use in connection with lightweight motor vehicles utilizing a spring loaded vertically arranged tubular shock absorber as part of the load carrying and wheel guiding structure of the wheel suspension, of the type shown in the copending application of E. S. MacPherson, Serial No. 73,044 now Patent 2,660,449. The upper end of the load carrying shock absorber is conventionally pivotally connected to a portion of the vehicle frame, or a portion of the vehicle body in the case of an integral frame and body construction, and the lower end of the shock absorber is rigidly mounted within a bracket formed with a laterally extending bored hole for the reception of the inner end of a stub axle or wheel spindle. The wheel spindle is secured to the mounting bracket by means of a vertically extending pin the lower end of which projects beneath the bracket and is formed with an integral ball adapted to be received within a socket provided at the outer end of a suspension arm serving as a portion of a wheel guiding structure. The wheel mounting construction is thus a compact and economically manufactured unit serving to connect the vehicle wheel to the load carrying shock absorber and also to the wheel guiding suspension arm.

Other objects and advantages of this invention will be made more apparent as this description proceeds, particularly when considered in connection with the accompanying drawings, wherein:

The single figure is a transverse cross-sectional view through a vehicle wheel and the wheel mounting of the present invention.

Reference is made to the copending application of E. S. MacPherson, Serial No. 73,044 now Patent 2,660,449, for a disclosure of a type of wheel suspension to which the wheel mounting construction of the present application may be applied. Referring now to the drawing. 10 indicates a vertically positioned tubular shock absorber of the telescopic load carrying type having its upper end connected to the vehicle (not shown). The lower end 11 of the shock absorber is secured, as by welding, in a vertical bore 12 formed in the mounting bracket 13. The mounting bracket 13 is also formed with a laterally extending tubular bore 14 intersecting the generally vertically extending bore 12.

A stub axle or wheel spindle 16 is provided, with its inner cylindrical end projecting into the laterally extending bore 14 formed in the supporting bracket 13. The outer end of the wheel spindle 16 is conventional and rotatably supports a wheel hub 17 by means of tapered roller bearings 18. A sheet metal stamped wheel body 19 is secured to the wheel hub 17 by means of a plurality of bolts 21.

The outboard portion of the mounting bracket 13 is formed with a vertically extending flange 22 to which is secured a conventional brake backing plate 23 supporting the usual brake mechanism including brake shoes 24.

The wheel spindle 16 is secured to the mounting bracket 13 by means of a pin 26. The intermediate portion 27 of the pin 26 is tapered and is received within the tapered opening 28 formed in the downwardly depending portion 29 of the mounting bracket 13. The body portion 29 of the pin 26 extends through aligned openings 30 and 31 formed in the mounting bracket 13 and the inner end of the wheel spindle 16, and the extreme upper end 32 of the pin 26 is threaded to receive the nut 33 to clamp the wheel spindle in the bore 14 of the mounting bracket 13.

The pin 26, beneath the intermediate tapered portion 27 thereof, is formed with an integral reversely tapered portion 34 terminating at its lower end in a spherical ball portion 36. The ball 36 is received within a spherical socket formed by bearing rings 37 and 38 carried within the outer end of a housing 39. The housing 39 is suitably secured as by means of a bolt 41 to the outer end of a suspension arm 42 projecting inwardly of the vehicle and connected at its opposite end to the vehicle frame (not shown).

From the foregoing it will be seen that an easily assembled and manufactured wheel mounting means is provided in which a stub axle or wheel spindle is supported upon a mounting bracket with the latter also serving as a support for the lower end of a load carrying telescopic shock absorber. Also contributing to a compact economical unit is a dual purpose pin serving to locate and interconnect the wheel spindle and the mounting bracket and also form a pivotal connection for the outer end of a suspension arm serving to guide the vehicle wheel in its rising and falling movements relative to the vehicle frame.

It will be understood that the invention is not to be limited to the exact construction shown and described, but that various changes and modifications may be made without departing from the spirit and scope of the invention, as defined in the appended claims.

What is claimed is:

1. A wheel mounting for supporting a vehicle road wheel upon a load carrying telescopic shock absorber and a wheel guiding suspension arm, comprising a mounting bracket having a vertical bore extending partially therethrough and opening in an upward direction and a lateral bore extending partially therethrough and opening in an outboard direction, said vertical and lateral bores intersecting each other and said vertical bore receiving and rigidly supporting the lower end of the load carrying shock absorber, a stub wheel spindle having its cylindrical inner end received within the lateral bore of said mounting bracket and projecting laterally outwardly therefrom for rotatably supporting the vehicle road wheel, said mounting bracket and the inner end of said wheel spindle having vertically aligned cylindrical openings formed therein with the lower portion of the opening in said mounting bracket having a tapered portion with the larger end at the bottom of the bracket, and an elongated rod extending through the aligned openings and having a tapered portion seated in the tapered portion of the opening in said mounting bracket, said rod having a threaded upper end receiving a nut to clamp said wheel spindle to said mounting bracket, and said rod also having an integral ball shaped lower end projecting beneath said mounting bracket for connection to the wheel guiding suspension arm.

2. A wheel mounting for supporting a vehicle road wheel upon a load carrying shock absorber and a wheel guiding suspension arm, comprising a mounting bracket having a generally vertically extending bore, the lower end of the shock absorber being positioned in the bore and rigidly secured to the bracket, said mounting bracket having a laterally extending bore therein opening outwardly toward the road wheel and intersected by said generally vertically extending bore, a wheel spindle having a tubular inner end received within the laterally extending bore in said mounting bracket, said mounting bracket and the inner end of said wheel spindle having aligned openings extending therethrough in a generally vertically direction, an elongated pin clamping member extending through said aligned openings to interconnect said wheel spindle and said mounting bracket, the lower end of said clamping member projecting completely through said mounting bracket and formed at its lower extremity with an integral ball for attachment to the suspension arm.

References Cited in the file of this patent

UNITED STATES PATENTS

| | | |
|---|---|---|
| 2,370,098 | Weiss | Feb. 20, 1945 |
| 2,660,449 | MacPherson | Nov. 24, 1953 |
| 2,713,497 | Bretschneider | July 19, 1955 |

FOREIGN PATENTS

| | | |
|---|---|---|
| 12,256 | Great Britain | May 20, 1911 |